May 14, 1935. W. T. RASCH 2,001,397
BURNER FOR GAS HEATED RADIATORS
Filed Sept. 9, 1930
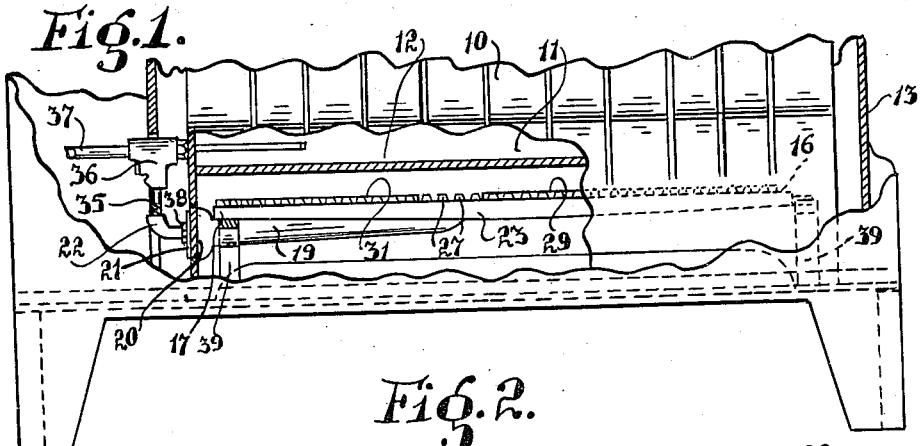
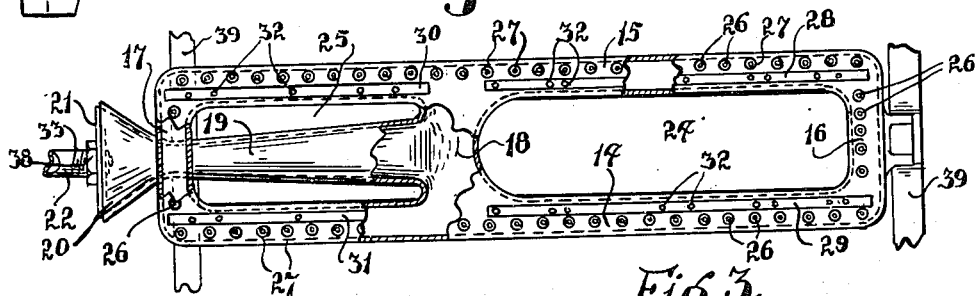
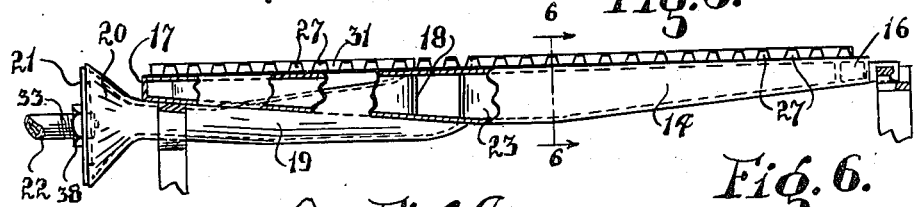
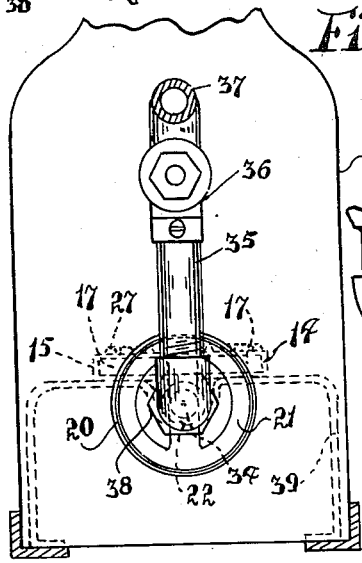
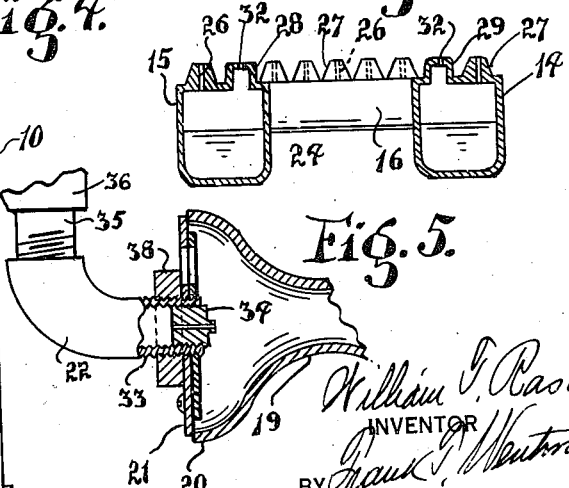
William T. Rasch
INVENTOR
BY Frank J. Wentworth
his ATTORNEY.

Patented May 14, 1935

2,001,397

UNITED STATES PATENT OFFICE 2,001,397

BURNER FOR GAS HEATED RADIATORS

William T. Rasch, New York, N. Y., assignor to American Gas Products Corporation, New York, N. Y., a corporation of New York Application September 9, 1930, Serial No. 480,764

5 Claims. (Cl. 158—104)

My invention relates to burners for gas heated radiators, and more particularly to a gas burner for use in the combustion chamber of such radiators.

The burner of my invention is particularly adapted for use in connection with radiators used for room heating purposes, it being constructed, and particularly adapted, for use in connection with steam or hot water radiators wherein the supply of gas to the burner is automatically controlled by a thermostat or other suitable regulator controlled by conditions within the radiator.

The burner of the invention includes a single casting having what is known as a "looped" mixing chamber provided with burner jet openings extending about the outer edge of the top of the burner upon both sides and across both ends thereof. The burner is provided with an integral distributing chamber communicating with the mixing chamber at a point remote from, and intermediate, the opposite ends thereof.

This distributing chamber is provided with an integral mixing tube having an enlarged bell shaped mouth adapted to be exposed through an opening in the wall of the combustion chamber in which the burner is located. The mixing tube does not extend through, nor open directly into, the mixing chamber, the looped form of this chamber resulting in openings extending through the burner so as to ensure an adequate supply of secondary air upon both sides of each burner jet opening.

The mixing tube is so constructed as to secure a Venturi tube action, and the distributing chamber is so positioned and located as to not only ensure a rapid distribution of the combustible mixture throughout the entire looped mixing chamber, but to secure an effective commingling of the gas and air prior to delivery to said chamber.

The formation and dimensions of the mixing chamber are such as to give it a variable capacity from adjacent the points of delivery of the combustible mixture to adjacent the burner openings most remote from this point of delivery.

Heretofore, in the operation of gas burners, a recognized drawback has been the ineffective propagation of flame throughout the space above all of the jet openings of the burner, and my invention contemplates the provision, in the burner, of means which will ensure the discharge of the mixture throughout the entire length of each side of the burner, substantially simultaneously, in volume sufficient to ensure the rapid propagation of flame about the entire burner top upon the application of a flame or spark adjacent any portion of the burner.

A further object of the invention is to so construct the burner as to facilitate access to the jet nipple discharging into the mixing tube, for the purpose of cleaning, or of the substitution of a fresh tip according to the needs of the burner.

The invention consists in the novel features of construction and combination of parts hereinafter set forth and described, and more particularly pointed out in the claims hereto appended.

Referring to the drawing,

Fig. 1 is a front view of a steam radiator having applied thereto a burner embodying the invention, the walls of the outer housing and of the combustion chamber being broken away;

Fig. 2 is a plan view of the burner removed from the combustion chamber with parts thereof broken away;

Fig. 3 is a side view thereof with a portion of the side wall broken away;

Fig. 4 is an end view of the combustion chamber illustrating the manner of connecting the burner with the source of gas supply;

Fig. 5 is an enlarged detail section of the mouth of the mixing tube showing the detailed construction of the parts of the burner used in connecting same with the source of gas supply; and Fig. 6 is an enlarged section on the line 6—6 of Fig. 3.

Like numerals refer to like parts throughout the several views.

In the embodiment of the invention shown in the drawing, 10 indicates the lower portion of a steam radiator having a combustion chamber 11. The crown of the combustion chamber is shown at 12. The casing surrounding the radiator is indicated at 13.

The burner of the invention includes a metal casting forming a substantially rectangular looped mixing chamber having side sections connected by end sections, a distributing chamber intermediate and remote from the end sections, and a mixing tube discharging into said distributing chamber and passing under one of said end sections.

The side sections of the burner casting are indicated at 14 and 15 respectively, and the end sections at 16 and 17. The portion of the casting forming the distributing chamber is indicated at 18, and the mixing tube at 19. Beyond the end section 17 the mixing tube 19 is provided with a bell shaped mouth 20 adapted to receive the air shutter 21 which is separate from the mixing tube and adjustably mounted upon the gas supply pipe 22 carrying the gas jet nozzle, which latter is directed into the mouth 20 of the mixing tube.

As shown more particularly in Fig. 3, each side section of the mixing chamber is of progressively increasing depth toward a point of the burner midway between the end sections 16 and 17. This is indicated at 23 in the drawing, and it is adjacent this point that the distributing chamber 18 discharges into each side section of the looped burner. This construction assures a gradually decreasing capacity in the mixing chamber from a medial point of the burner towards the opposite end sections 16 and 17 which will ensure a more equal distribution of the gas throughout the mixing chamber, not only when the burner is first lit, but so long as the burner is in operation.

It will be noted, by reference to Figs. 2 and 3, that the distributing chamber 18 is, toward the ends thereof discharging into the side sections 14 and 15, flared in a manner to direct the flow of gas into the straight-away portions of the side sections, and to also secure a baffle effect for securing a thorough admixture of the gas and primary air as it emerges from the mixing tube and flows into the distributing chamber.

The side sections 14 and 15 are spaced from each other in a manner to provide air spaces 24 and 25 through the burner and within the burner jet openings, through which air may circulate, so that an adequate supply of secondary air is provided upon opposite sides of the burner jet openings throughout the looped mixing chamber casing. In fact, the secondary air for the burner jet openings, as to the end sections 16 and 17 thereof, and particularly as to the end section 16, is derived mainly from the central openings 24 and 25 through the burner casing.

The side sections 14 and 15 and the end sections 16 and 17 are each provided with a sequence of projecting burner jet openings 26 formed in nipples 27 extending from the top of the casting and communicating with the mixing chamber. This opening is shown more particularly in Fig. 6. The openings 26 are ordinarily drilled in the casting and are of a size to secure the desired gas consumption.

The use of nipples 27, which is a common use, has been found to possess the objectionable characteristic that when first lighting the burner there is an inadequate distribution of gas to the various nipples, so that the propagation of flame throughout the entire area of the top of the burner casting is slow, and there is, quite frequently, a discharge of gas in small volume which is not promptly ignited, thus resulting in back-firing in the combustion chamber as gas accumulates therein.

To avoid this condition, I form, in the top plate of the burner casting, upwardly projecting hollow ribs 28, 29, 30 and 31 of a height approximating that of the burner nipples 27. These ribs terminate adjacent the distributing chamber 18 and extend closely adjacent the nipples 27.

Each of the ribs 28 to 31 has burner openings 32 therethrough so arranged as to secure a desired distribution of the gas adjacent the various burner openings in each of the side sections 14 and 15 from adjacent the point of delivery of gas to the mixing chamber beneath said burner openings to adjacent the end sections 16 and 17.

The channel within the ribs 28 to 31 is open downwardly and throughout its length is unobstructed so as to ensure a rapid flow of gas throughout the entire length of each of the ribs as gas is delivered to the mixing chamber.

In view of the fact that the pressure of gas within the mixing chamber is, when the gas is first turned on, at its maximum adjacent the distributing chamber 18, no auxiliary gas jet openings are required adjacent this point since the discharge from the burner openings is adequate to ensure the rapid ignition of the gas emitted therefrom. Toward the ends of the side sections 14 and 15 the emission of gas is not so rapid, so far as the burner openings are concerned, and it is for this reason that the ribs are disposed as shown in the drawing. The purpose of the auxiliary burner openings in the ribs 28 to 31 is to ensure the rapid conduction of gas throughout the entire length of the burner and its discharge adjacent the burner openings in sufficient volume to ensure the rapid propagation of flame throughout the entire length of the burner and avoid the accumulation of gas as a result of unequal pressure conditions in different portions of the mixing chamber when first lighting the burner, and the well known tendency of gas to escape in small volume from the burner openings without becoming ignited.

The mixing tube 19 is constricted adjacent the flared or bell shaped mouth 20, but is of progressively increasing dimensions toward the distributing chamber 18, thus securing a Venturi effect.

One of the difficulties of connecting a gas burner, of the type to which the invention relates, to the source of gas supply has been the practice of mounting the air shutter upon the end of the mixing tube. With this construction, the making of the gas connections has required the use of various elbows and nipples and the taking down of the entire connection for the purpose of cleaning the jet nipple or of replacing it when it is clogged beyond repair.

In the burner of the invention, instead of mounting the air shutter upon the mixing tube, I mount it upon a fitting carrying the jet nozzle. This fitting is screw threaded upon a nipple connected with the thermostat or gas regulator by which the supply of gas to the burner is automatically controlled.

The bell shaped mouth 20 of the mixing tube has dimensions which will permit the turning of the fitting about the axis of the nipple to which it is screw threaded, so that by movement of the air shutter mechanism along the fitting, the fitting may be turned so as to permit free access to the nipple without disturbing any of the connections of the regulator mechanism or any other part of the pipe line.

Referring more particularly to Fig. 5 of the drawing, the air shutter 21 is mounted upon screw threads 33 upon the fitting 22 forming a part of the gas supply line and carrying the gas jet nozzle 34. This fitting is screw threaded upon a nipple 35, which in turn, in the form of the invention shown, is connected to the thermostatic control device 36 into which the main gas line 37 discharges. The air shutter is held in the proper position in relation to the bell shaped mouth 20 of the mixing tube 19 by means of a lock nut 38.

The burner is supported in the combustion chamber 11 upon suitable brackets 39, suitably formed to accommodate the mixing tube 19.

The operation of the herein described burner is substantially as follows:—

The burner casting is mounted upon the brackets 39 with the open, bell shaped mouth 20 exposed through an opening in the wall of the combustion chamber, as shown more particularly in Fig. 1.

The fitting 22, with the gas jet nozzle 34 secured to interior screw threads in the end of this fitting in the usual manner, is then brought to a position at right angles to the bell shaped mouth 20 and the air shutter adjusted along this fitting so as to be sufficiently remote from the end of the fitting to permit the fitting to be turned by a wrench to accurately center the jet nozzle 34 with the axis of the mixing tube 19. When said jet nozzle is accurately adjusted, the air shutter is merely turned upon the screw threads 33 until it abuts against the end of the mouth 20 of the mixing tube. When so positioned, the lock nut 38 is tightened so as to hold the air shutter in the proper position.

If it be desired to have access to the jet nozzle 34 for any purpose, it is merely necessary to release the lock nut 38, move the air shutter away from the mixing tube and then turn the fitting 22 about the axis of the nipple 35, thus exposing the nozzle jet in a position where access may be conveniently had thereto.

When lighting the burner, the gas supply is turned on by means of an ordinary gas cock, and a mixture of gas and air is forcibly discharged into the mixing tube 19 and receives an accelerated rate of flow by reason of the Venturi effect secured by the constriction of the tube. The mixture flows from the mixing tube 19, into the distributing chamber 18 and against the wall of this chamber opposite the discharge end of the mixing tube. The impingement of the mixture against said wall not only gives the desired direction of flow to the gases, but imparts somewhat of a whirling action thereto which increases the effectiveness of the mixture as it is delivered to the mixing chamber in the sides 14 and 15 of the burner casting.

The pressure of gas is such as to ensure a fairly rapid flow of the gas through the burner nipples 27, adjacent the distributing chamber 18, but at points in the mixing chamber more remote from the distributing chamber, the rate of the flow of the gases will, momentarily, be sufficiently lower than adjacent the distributing chamber to result in a slow emission of the gases which, under ordinary circumstances, results in a slow propagation of flame about the burner.

However, the gases, as they flow from the distributing chamber 18, enter the channel formed upon the under side of the ribs 28 to 31 respectively and rapidly pass along the entire length of this channel in sufficient volume to ensure the escape of gases adjacent burner openings remote from the distributing chamber in sufficient volume to ensure their being rapidly ignited, so that with the accumulation of any substantial quantity of gas above any of the burner openings remote from said distributing chamber, these gases will be immediately ignited from the burner openings 32 in the various ribs 28 to 31. The distribution of the openings in these ribs is not for the purpose of developing heat during the operation of the burner, but merely for the purpose of ensuring, throughout the entire length of the burner when first firing same, gas in sufficient volume to ensure the quick ignition of gas at all the jet openings and avoid the accumulation of unignited gas in a manner which might result in explosions or backfiring.

It will be noted that while the nipples 27 and the ribs 28 to 31 project from the burner top to substantially the same extent, the openings 26 are very much longer than the openings through the tops of said ribs. It will also be noted that the openings through the ribs are few in number and at spaced intervals for the purpose of effecting a rapid distribution of gas. Gas will flow more rapidly through the short openings in the ribs than it will through the long openings in the nipples.

An ample supply of secondary air, by reason of the openings 24 and 25, centrally of the width of the burner, as well as the exposed sides of the burner, ensures high efficiency in the burner. The progressively decreasing depth of the mixing chamber ensures a continued effective distribution of the gas throughout the burner loop.

Notwithstanding the casting problems, the increased efficiency of a burner embodying the invention is such as to justify the increased expense as compared with other types of burners.

In the foregoing specification the term "distributing chamber" has been used to indicate a chamber connecting opposite sides of a looped mixing chamber and connected substantially centrally thereof with a mixing tube in order to simultaneously deliver a combustible mixture to the opposite side sections of a looped burner section.

The ribs 28 to 31, with their jet openings 32, may be termed gas distributors since their function is merely to ensure an adequate volume of gas throughout the entire length of the burner when first firing same. These ribs in no sense act as a pilot light, but are more in the nature of a priming device to ensure the presence of flaming gases adjacent the burner openings at a time when the discharge of the combustible mixture through these openings is not sufficient to ensure the ignition thereof.

It is not my intention to limit the invention to the precise details of construction shown in the drawing, it being obvious that such may be varied without departing from the spirit and scope of the invention.

Having described the invention, what I claim as new and desire to have protected by Letters Patent, is:—

1. A burner for gas heated radiators, embodying therein means forming a looped mixing chamber having nipples projecting from the top thereof along one edge of the opposite sides and the opposite ends thereof, said nipples having burner openings therethrough, a distributing chamber communicating with opposite sides of said mixing chamber between and remote from the ends thereof, hollow ribs projecting from the top of opposite sides of said mixing chamber adjacent said nipples and extending from points adjacent said distributing chamber to adjacent the opposite ends of said mixing chamber, said ribs having openings therethrough remote from said distributing chamber, and a mixing tube discharging into said distributing chamber, an air shutter mounted adjacent the mouth of said mixing tube and a fitting carrying a jet nozzle projecting from said air shutter and discharging into said tube.

2. A burner for gas heated radiators, embodying therein means forming a looped mixing chamber having nipples projecting from the top thereof along one edge of the opposite sides and the opposite ends thereof, said nipples having burner openings therethrough, a distributing chamber extending from one side of said mixing chamber to the other side thereof between and remote from the ends of said mixing chamber, hollow ribs projecting from the top of opposite sides of said mixing chamber adjacent said nipples and extending from points adjacent said distributing chamber to adjacent the opposite ends of said mixing chamber, said ribs having openings therethrough remote from said distributing chamber, and a mixing tube extending from said distributing chamber between the sides of said mixing chamber, whereby a combustible mixture flowing through said tube will be directed by the wall of said distributing chamber into the opposite sides of the mixing chamber, said mixing tube having a bell shaped mouth, a constricted portion adjacent said mouth and progressively increased dimensions toward said distributing chamber, an air shutter mounted adjacent the mouth of said mixing tube and a fitting carrying a jet nozzle projecting through said air shutter and discharging into said tube.

3. A burner for gas heated radiators, embodying therein means forming a looped mixing chamber having nipples projecting from the top thereof along one edge of the opposite sides and the opposite ends thereof, said nipples having burner openings therethrough, a distributing chamber extending from one side of said mixing chamber to the other side thereof between and remote from the ends of said mixing chamber, hollow ribs projecting from the top of opposite sides of said mixing chamber adjacent said nipples and extending from points adjacent said distributing chamber to adjacent the opposite ends of said mixing chamber, said ribs having openings therethrough remote from said distributing chamber, and a mixing tube extending from said distributing chamber between the sides of said mixing chamber, whereby a combustible mixture flowing through said tube will be directed by the wall of said distributing chamber into the opposite sides of the mixing chamber, said mixing tube having a bell shaped mouth, a constricted portion adjacent said mouth and progressively increased dimensions toward said distributing chamber, an elbow fitting supported by means of screw threads from a nipple connected with the source of supply of gas, an air shutter adjustably mounted upon said fitting, a jet nozzle carried by said fitting and adapted to be positioned within the mouth of said mixing tube, and means whereby said air shutter may be adjusted upon said fitting toward or from the mouth of said tube.

4. A burner for gas heated radiators, embodying therein means forming a looped mixing chamber having nipples projecting from adjacent the outer edge of the top along the opposite sides and the opposite ends thereof, said nipples having burner openings therethrough, a distributing chamber communicating with opposite sides of said mixing chamber between and remote from the ends thereof, the sides of said mixing chamber being spaced in relation to each other and the ends thereof being spaced from said distributing chamber, whereby openings are formed through the burner for the admission of secondary air, hollow ribs projecting from the top of opposite sides of said mixing chamber between said nipples and the openings between the sides of said mixing chamber and extending from adjacent said distributing chamber to adjacent the opposite ends of said mixing chamber, said ribs having openings therethrough remote from said distributing chamber, and a mixing tube discharging into said distributing chamber, an air shutter mounted adjacent the mouth of said mixing tube and a fitting carrying a jet nozzle projecting from said air shutter and discharging into said tube.

5. A burner for gas heated radiators embodying therein a continuous looped member forming a mixing chamber having substantially parallel side sections and substantially parallel end sections, a distributing chamber intermediate and remote from the end sections communicating with said side sections respectively, the portions of the mixing chamber within said side sections being of progressively increasing depth from each end section to a point adjacent said distributing chamber, and the portions of the mixing chamber within said end sections being of substantially the same capacity as the smallest portion of the mixing chamber in said side sections, a sequence of nipples extending from the top of said side and said end sections respectively and having jet openings passing therethrough communicating with said mixing chamber, a mixing tube passing under one end of said mixing chamber and discharging into said distributing chamber, each mixing chamber having hollow ribs which extend from a point adjacent the connection to the distributing chamber to adjacent the end sections; said ribs being of substantially the same height as, and closely adjacent said nipples, each of said ribs having openings therethrough communicating with said mixing chamber adjacent all of said openings, whereby the combustible mixture in said mixing chamber is delivered adjacent burner openings remote from said distributing chamber.

WILLIAM T. RASCH.